DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1362

T889,004

METHOD OF ATTACHING PLASTIC SHOES TO ANIMAL HOOFS

Kenneth W. Hyche, 4511 Grace Drive, and William F. Thomsen, 4514 Brookridge Drive, both of Kingsport, Tenn. 37664

Filed Apr. 20, 1970, Ser. No. 30,301

Int. Cl. A01l *3/00, 5/00*

U.S. Cl. 168—4

No Drawing. 6 Pages Specification

A method of providing horses with plastic horseshoes which involves the bonding of the plastic shoes to the horse's hoofs with a monomeric α-cyanoacrylate adhesive such as methyl 2-cyanoacrylate. The method involves the steps of (1) smoothing the bottom surface of the hoof material to eliminate any irregularities therein, (2) treating the surface of the plastic shoe with the adhesive, (3) contacting the adhesive treated surface with the smooth hoof surface, and (4) applying pressure for a short period of time. Preferably, a shock absorbing sheet of material such as rubber is interposed between the plastic shoe and the hoof surface and bonded to both surfaces by the same adhesive. This method is especially useful and advantageous in that (1) the adhesive sets up almost immediately, and (2) the use of plastic shoes eliminates the heavy weight of iron shoes and the use of nails in the shoeing operation.